United States Patent

[11] 3,590,728

| [72] | Inventor | Mary E. Stanley<br>P.O. Box 175, Rockingham, N.C. 28379 |
|---|---|---|
| [21] | Appl. No. | 828,548 |
| [22] | Filed | May 28, 1969 |
| [45] | Patented | July 6, 1971 |

[54] CONE PAN OR MOLD
4 Claims, 10 Drawing Figs.

[52] U.S. Cl. ................................................. 99/439
[51] Int. Cl. .................................................. A47j 43/18
[50] Field of Search ........................................ 99/416, 426, 428, 438, 439, 440; 107/19

[56] References Cited
UNITED STATES PATENTS
2,191,921 2/1940 Ziringer ........................ 107/19

| 3,296,956 | 1/1967 | Turner | 107/19 |
| 3,579,120 | 4/1968 | Fogle | 99/439 |
| 3,424,076 | 1/1969 | Bernatz et al. | 99/426 |

Primary Examiner—Henry S. Jaudon
Attorneys—A. Yates Dowell and A. Yates Dowell, Jr.

ABSTRACT: A pan or mold for use in the production of baked cones capable of being used for holding other foods such as ground meat or the like and which pan or mold includes complementary conical mold members with receiving and received aligning portions with the spaces between the larger ends of the cones open to allow substantially unobstructed spaces between the larger extremities for the maximum expansion of the dough and the provision of irregular upper end walls on the cone.

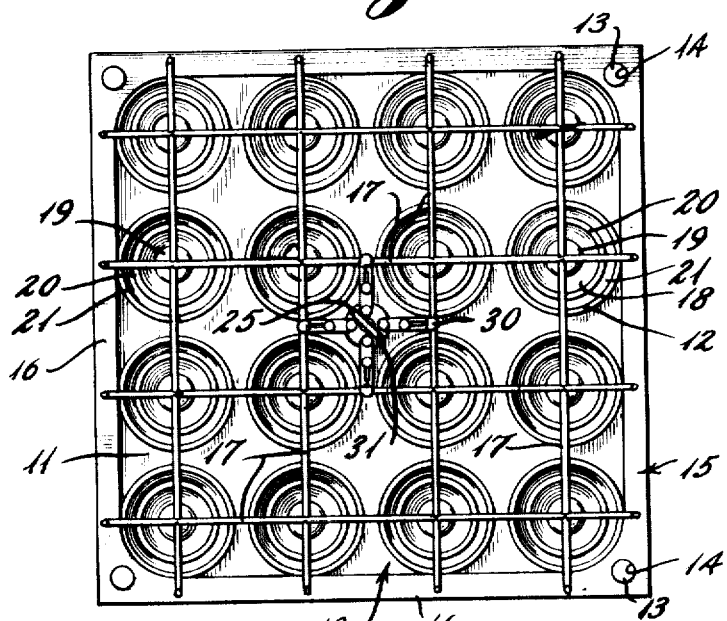
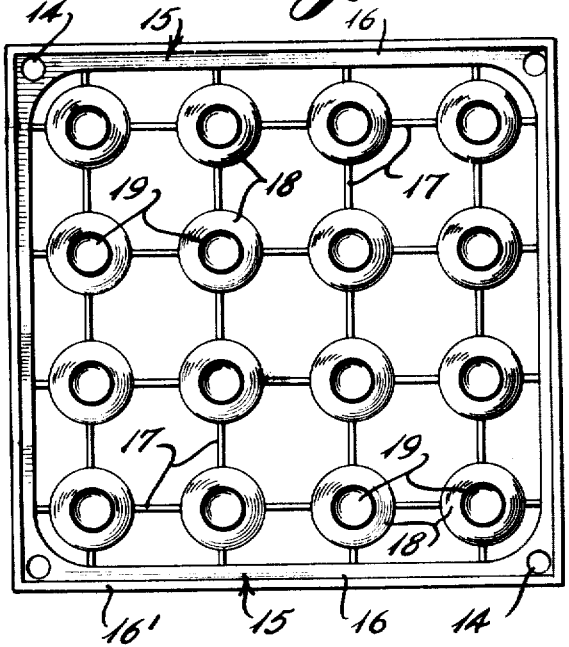
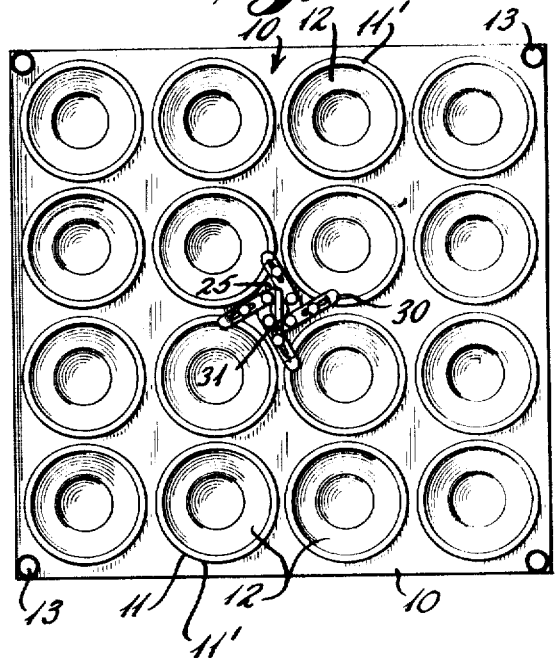
INVENTOR
MARY E. STANLEY

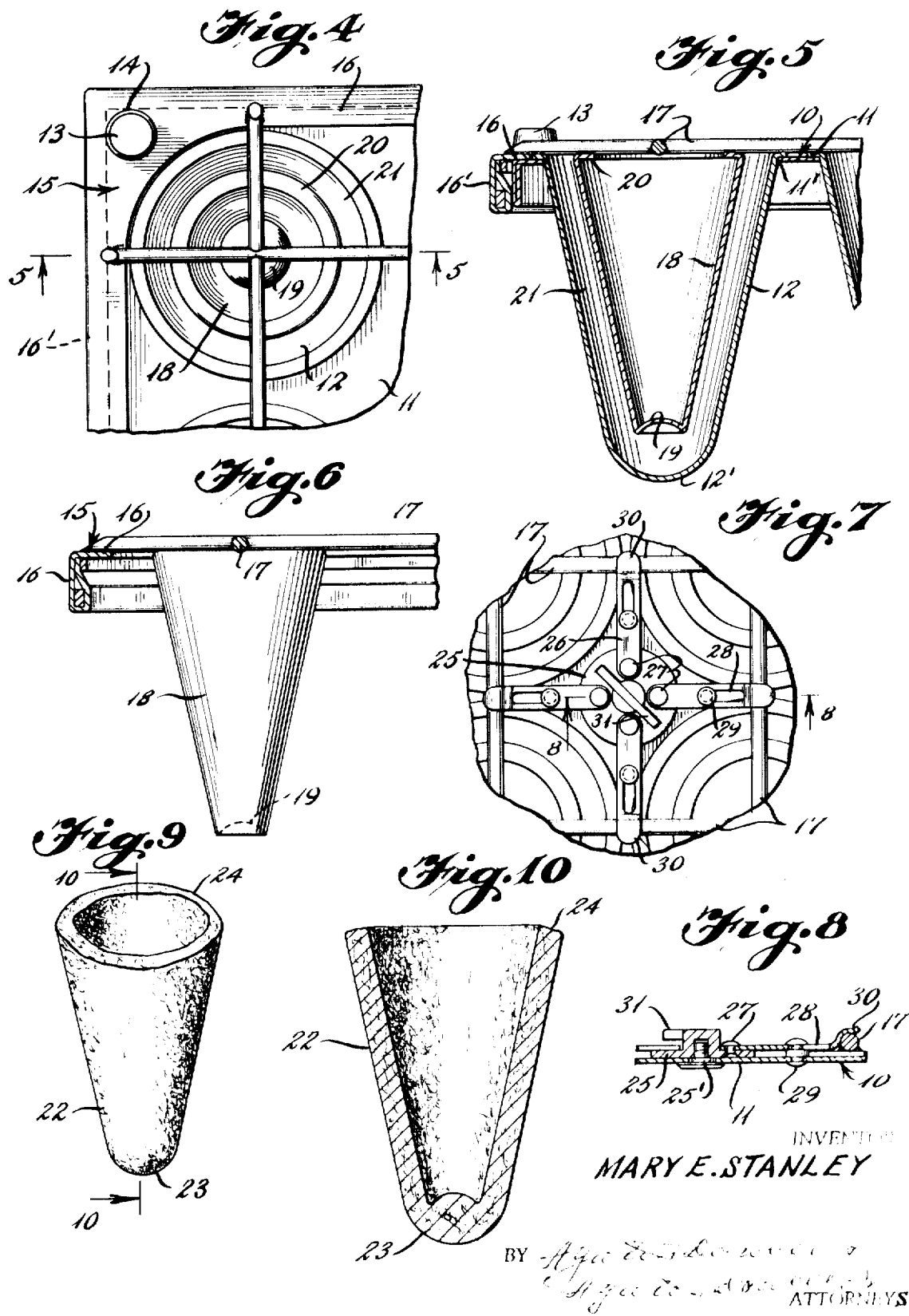

3,590,728

CONE PAN OR MOLD

BACKGROUND OF THE INVENTION

1. Field of the Invention

This invention relates generally to the preparation of edible food products and relates particularly to utensils for forming and baking products of yeast raised dough or the like which permit full expansion of the dough to provide an irregular upper end wall and permit certain areas of the product to be of substantially constant thickness while other portions have a different thickness.

2. Description of the Prior Art

Heretofore many efforts have been made to provide molds or utensils for forming edible food products, including baking pans of various sizes and configurations. Some of these prior devices, for example the U.S. Pat. Nos. 3,290,134 and 3,296,956 to Turner, and the U.S. Pat. No. 1,831,147 to Smith, have been used in the production of cups or cones. However, these prior art devices have not been entirely satisfactory since most of the pans or utensils have provided an open cavity and the pans with male and female mold members have been excessively heavy and complicated and have required that a fixed amount of dough or other material be placed within the cavity. Also, in most instances, the utensils with male and female mold members have provided a cavity which is entirely enclosed, is flat on the bottom, and which has retarded the escape of gases and the like, prevented the formation of an attractive irregular upper end wall, and for other reasons have not been satisfactory.

SUMMARY OF THE INVENTION AND OBJECTS

The invention comprises complementary mold members each of which contains hollow cones which when fitted together provide cavities for dough that are open at the top to allow full expansion of the dough in conical form with an attractive irregular edge about its upper open end. Aligning posts and sockets are provided between the cooperating mold members and one of such members has a rim in which the other member fits when the parts are in assembled relation. Preferably, the two mold members are provided with locking mechanism for fastening them in fixed relation. Further, the cooperating conical members which form the cones are generally parallel with each other for most of their lengths but have reverse concave and convex portions at the small end so that the small end of the cone is thickened.

It is an object of the invention to provide a pan or mold capable of being utilized in producing a simple, attractive, highly palatable prepared food article of dough, cake batter, pastry, or other material, and the cavities of such mold have tops open to allow free upward expansion of the dough with a natural irregular edge about its larger open end while at the same time its small end is closed and has thickened internal and external rounded end portions.

BRIEF DESCRIPTION OF THE DRAWINGS

FIG. 1 is a top plan view of an assembled two-part mold illustrating one application of the invention;

FIG. 2, a bottom plan view of the upper or male mold grid member;

FIG. 3, a top plan view of the lower or female mold member;

FIG. 4, an enlarged fragmentary top plan view of one corner of the mold members of FIG. 1;

FIG. 5, a vertical section on the line 5-5 of FIG. 4;

FIG. 6, an enlarged fragmentary section of the upper mold member;

FIG. 7, an enlarged fragmentary plan view of the locking mechanism;

FIG. 8, a section on the line 8-8 of FIG. 7 through the locking member;

FIG. 9, a perspective of the completed food product; and

FIG. 10, a section on the line 10-10 of FIG. 9.

DESCRIPTION OF THE PREFERRED EMBODIMENT

The pan or mold of the present invention comprises a generally planar first or lower support member 10 including a plate member 11 of sheet metal or the like of square, rectangular, or other configuration. The plate member 11 has a plurality of openings 11' in each of which is welded or otherwise secured the upper end of a hollow generally conical member 12. The members 12 converge downwardly from a relatively wide upper end to a relatively narrow lower end and terminate in a lower end portion 12' which is generally semispherical in cross section.

The lower support member 10 is provided with upstanding projections 13 one at each corner adapted to fit into sockets or openings 14 in a generally planar upper support member 15. This upper support member 15 includes an annular rim 16 defining a large central opening. The rim 16 has a downwardly extending flange 16' along each edge within which the edge of the lower support member 10 is adapted to be snugly received and, in cooperation with the projections and sockets, maintains the lower and upper support members in predetermined relationship.

The upper support member 15 has a plurality of grid members 17 formed of wire or rod stock which form an open grid over the large central opening. The ends of the grid members 17 are welded or otherwise secured to the annular rim 16 and such grid members form a frame or base on which a series of depending hollow generally conical members 18 are attached. The members 18 converge downwardly at substantially the same angle as the members 12 and terminate in concave lower ends 19. The upper ends of the members 12 have inwardly flanged extremities 20 by which such members are welded or otherwise attached to the grid members 17. The hollow conical members 18 are located in a manner to fit substantially concentrically within the hollow conical members 12 and provide cavities 21 having generally parallel walls to permit dough to rise substantially to the top of the cavities 21. When baked such dough will form cones 22 having rounded thickened lower extremities 23 and irregular upper edges 24. With this construction there is no abnormal compression of dough or entrapment of air within the space 21.

In order to maintain the complementary lower and upper support members or mold portions in cooperative assembled abutting relation, central latching means is provided carried by the lower support member or mold portion 10 and adapted to selectively engage the grid members 17 of the upper mold members. This latching mechanism includes a rotatable disc or circular body portion 25 held in place by a screw or pivot pin 25' connected to the plate 11 of the lower support member 10. To the body portion 25, fingers 26 are swingably mounted by pivot pins or shafts 27. The fingers 26 have slots 28 intermediate their ends through which extend guide pins 29 carried by the plate member 11. The outer ends of the fingers 26 are provided with upwardly and outwardly curved portions 30 which, when projected, extend over adjacent grid members 17 of the upper support member thus maintaining the lower and upper support members in cooperative assembled relation. When the fingers 26 are retracted the outer ends are free of the grid members 17. In order to accomplish such projection and retraction an operating member 31 is attached to the disc 25.

In the operation of the device, the upper and lower support members 10 and 15 are separated and a predetermined amount of dough containing yeast is placed in each of the conical members 12 of the lower support member 10. The upper support member 15 then is placed on the lower support member with the flange 16' in engagement with the edges of the lower support member 10. When the upper and lower support members are in position, the body portion 25 is rotated by the member 31 to cause the fingers 26 to be extended to a position in which the curved portions 30 overlie and engage the grid members 17. The apparatus then is placed in a warm environment for a predetermined period of time to permit the dough to rise due to the yeast. Thereafter the apparatus is placed in a preheated oven to bake the product. During the baking process hot air from the oven is free to circulate around the upper portion of the cavities to form a golden brown crust of irregular configuration on the upper edges 24 of each cone.

It will be apparent from the foregoing that complementary, multicavity mold members are provided which may be readily placed together and secured in cooperative assembled relation after predetermined quantities of dough have been introduced into the lower or receiving mold cavities, and the cone formed by the dough supported both internally and externally during the baking process. The invention contemplates the use of yeast-raised dough, cake batter, pastry, or other types of prepared dough.

I claim:

1. A multiple cavity mold for use in the baking of conical food products, said mold comprising a generally planar lower support member having a plurality of spaced openings therein, a series of first conical members connected to said support member one adjacent to each of said openings, each of said first conical members having an open top of substantially the same size as said openings and in alignment therewith, the lower end of each of said first conical members being generally semispherical in cross section, an upper support member selectively mounted on said lower support member, said upper support member including a rim defining a central opening, an open grid fixed to opposite sides of said rim and spanning said central opening, a plurality of second conical members mounted on said grid and substantially concentric with said first conical members and defining an annular cavity therebetween, said second conical members being smaller than said first conical members, the lower end of each of said second conical members terminating in a concave portion curved in a direction opposite the curvature of the lower ends of said first conical members, and latching means carried by one of said support members and adapted to selectively engage the other support member to lock said support members in assembled relation.

2. The structure of claim in which one of said support members has a peripheral flange adapted to engage the edge of the other support member.

3. A multiple cavity mold for use in the baking of conical food products, said mold comprising a lower support member, a plurality of spaced first conical members carried by said lower support member, each of said first conical members having a relatively large open top and converging downwardly to a smaller bottom, an upper support member selectively mounted on said lower support member, said upper support member including a rim defining a central opening, an open grid fixed to opposite sides of said rim and spanning said central opening, a plurality of second conical members mounted on said grid, said second conical members being smaller than and substantially concentric with said first conical members and providing an open-topped annular cavity therebetween, and latching means carried by one of said support members and adapted to selectively engage the other support member to lock said upper and lower support members in assembled relation.

4. The structure of claim 3 in which said latching means includes a rotatable body carried by said lower support member, a plurality of fingers swingably connected to said body, each of said fingers being slidably mounted on pins carried by said lower support member and adapted to engage the grid of said upper support member when said fingers are extended.